(12) United States Patent
Radford et al.

(10) Patent No.: US 9,618,213 B2
(45) Date of Patent: Apr. 11, 2017

(54) COOKING OVEN AND METHOD WITH REMOVABLE AIR DIFFUSER

(71) Applicant: MANITOWOC FOODSERVICE COMPANIES, LLC, Manitowoc, WI (US)

(72) Inventors: Philip John Radford, Ash Vale (GB); Lewis William James Bannochie, Kingston Upon Thames (GB); Matthew David Underwood, Brockham (GB)

(73) Assignee: MANITOWOC FOODSERVICE COMPANIES, LLC, Manitowoc, WI (US)

( * ) Notice: Subject to any disclaimer, the term of this patent is extended or adjusted under 35 U.S.C. 154(b) by 496 days.

(21) Appl. No.: 14/074,249

(22) Filed: Nov. 7, 2013

(65) Prior Publication Data

US 2014/0137852 A1 May 22, 2014

Related U.S. Application Data

(60) Provisional application No. 61/729,105, filed on Nov. 21, 2012.

(51) Int. Cl.
*F24C 15/32* (2006.01)
*A21B 1/24* (2006.01)

(52) U.S. Cl.
CPC .............. *F24C 15/325* (2013.01); *A21B 1/245* (2013.01); *Y10T 29/49826* (2015.01)

(58) Field of Classification Search
CPC ........................... A47J 39/003; F24C 15/2007
USPC .................................. 126/15 A, 21 A; 29/428
See application file for complete search history.

(56) References Cited

U.S. PATENT DOCUMENTS

| 4,928,663 | A | * | 5/1990 | Nevin et al. ................. 126/21 A |
| 5,928,541 | A | * | 7/1999 | Tsukamoto et al. .......... 219/400 |
| 6,126,728 | A | * | 10/2000 | Walsh et al. .................... 96/101 |
| 2005/0217503 | A1 | | 10/2005 | McFadden |

FOREIGN PATENT DOCUMENTS

| EP | 1 992 879 A1 | 11/2008 |
| JP | S55 17023 A | 2/1980 |
| JP | S56 68805 U | 6/1981 |
| JP | H03 93306 U | 9/1991 |

OTHER PUBLICATIONS

Extended European Search Report and Opinion dated Apr. 4, 2014 from corresponding EP Application No. 13193705.4, 6 pages.

(Continued)

*Primary Examiner* — Avinash Savani
(74) *Attorney, Agent, or Firm* — Ohlandt, Greeley, Ruggiero & Perle, L.L.P.

(57) ABSTRACT

A cooking oven with an air diffuser disposed in the oven cavity to diffuse circulating air prior to entering an air inlet to a fan. The oven cavity comprises a wall with the air inlet aligned with the fan that draws the circulating air from the oven cavity. The air diffuser is installed in front of the wall and diffuses the circulating air evenly across food in the oven cavity and into the fan return without reducing an overall mass flow rate of the air.

20 Claims, 8 Drawing Sheets

(56) References Cited

OTHER PUBLICATIONS

Russian Patent Office action dated Apr. 3, 2015 from corresponding Russian Patent Application No. 2013151975/12 (081032) with English translation, pp. 5.

Office Action dated Aug. 5, 2015 for corresponding Chinese patent application No. 201310596175.9, pp. 13.

* cited by examiner

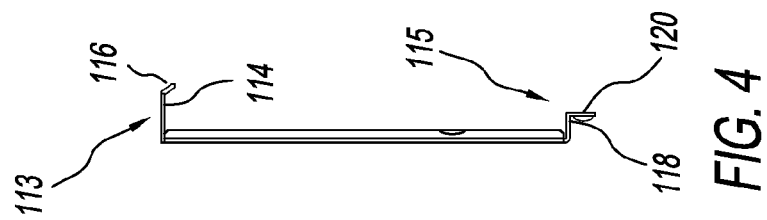
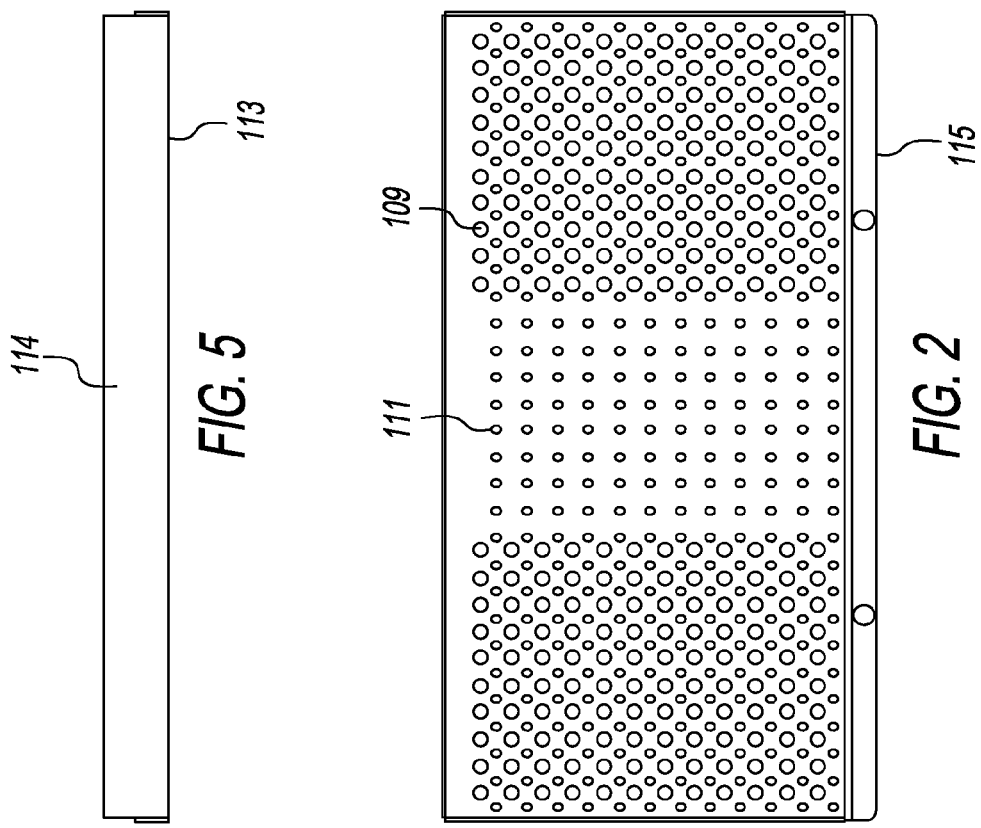
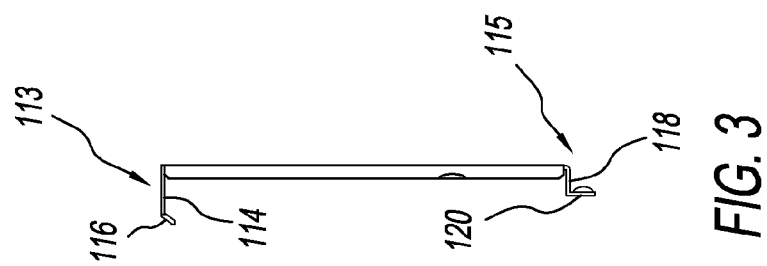

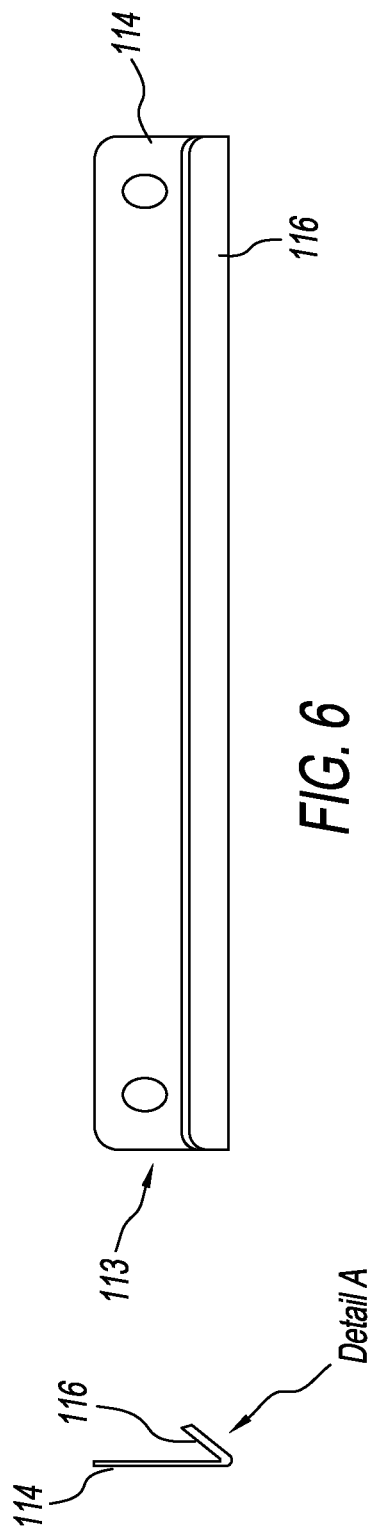

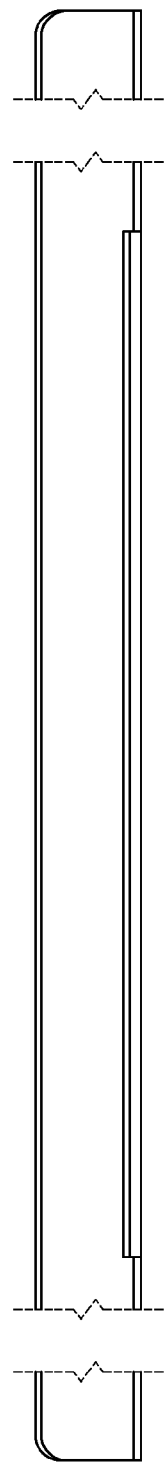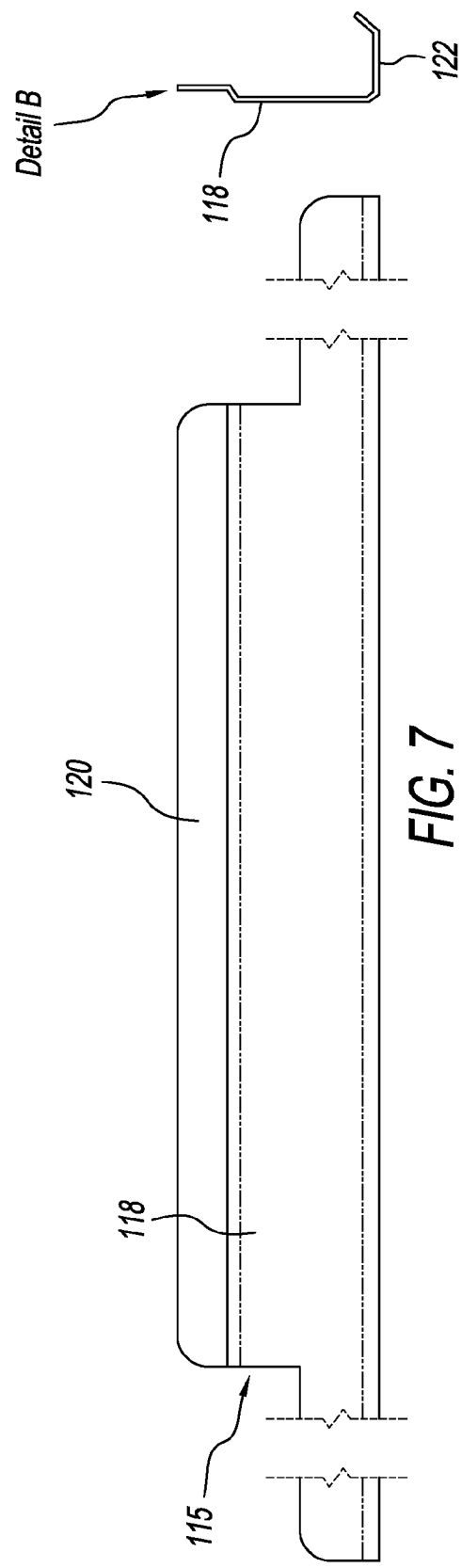

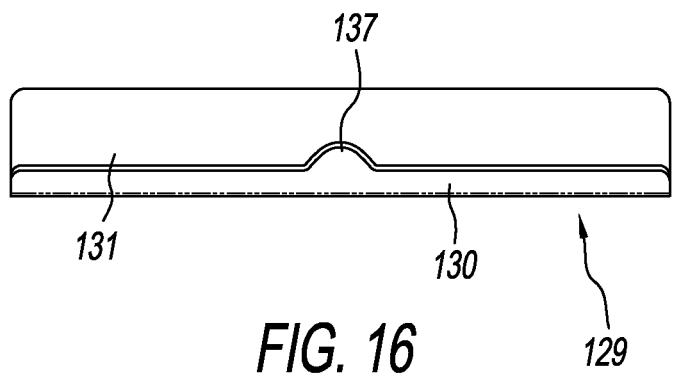
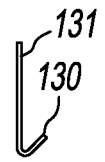
FIG. 16    FIG. 17
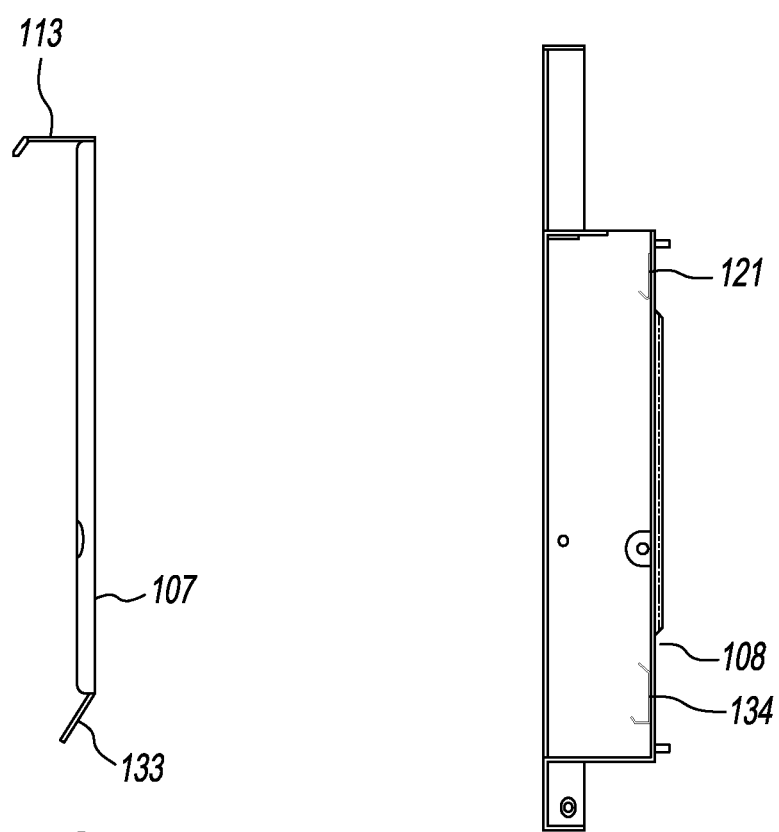
FIG. 18    FIG. 19

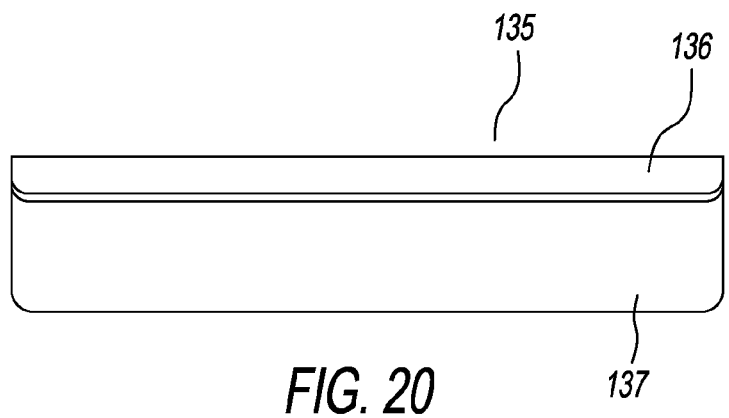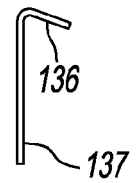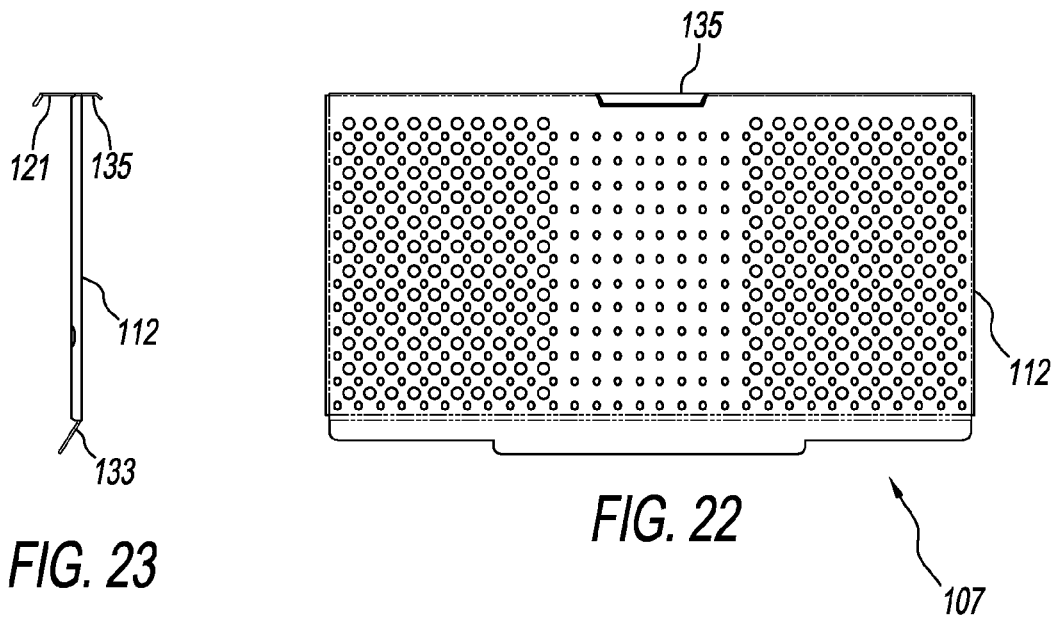

COOKING OVEN AND METHOD WITH REMOVABLE AIR DIFFUSER

RELATED APPLICATION

This application claims the priority benefit of U.S. Provisional Patent Application Ser. No. 61/729,105, filed on Nov. 21, 2012, the content of which is hereby incorporated herein in its entirety.

BACKGROUND OF THE DISCLOSURE

1. Field

The present disclosure relates generally to a cooking oven and method that provides an improved high speed air flow within its cooking cavity.

2. Discussion of the Background Art

Conventional air diffusers include orifices of identical dimensions which cause food product contained within the oven's cavity to undesirably move about the cavity. That is, the hot air in the cavity can move very quickly when cooking and this fast air flow can draw pieces of the food product into the rotating fan inlet. In addition, such air diffusers are not easily removable from the oven cavity.

Thus there is a need for an improved cooking oven and method that provides an airflow without disturbing a food product being cooked within the cooking cavity.

There is also a need for a cooking oven and method that provides easy cleaning of air diffusion parts of the oven cooking cavity.

BRIEF SUMMARY OF THE DISCLOSURE

The cooking oven and method of the present disclosure provides a removable air diffuser positioned within the oven cavity. The air diffuser includes a pattern of larger and small holes or orifices to allow for air to flow therethrough without disturbing the food product being cooked within the oven cavity.

An embodiment of a cooking oven according to the present disclosure comprises a cooking cavity for cooking a food product. The cooking cavity comprises a wall in which an air inlet is centrally disposed. A ductwork is in fluid communication with the cooking cavity. A fan circulates heated air via the ductwork, the oven cavity and the air inlet. An air diffuser is disposed in the oven cavity in front of the wall and comprises a structure that diffuses the heated air evenly across the food product and into the air inlet.

In another embodiment of a cooking oven according to the present disclosure, the structure comprises a plate with a plurality of holes of different diameter sizes configured to diffuse the heated air.

In another embodiment of a cooking oven according to the present disclosure, the plurality of holes comprises a first group of large diameter sizes, a second group of large diameter sizes and a third group of small diameter sizes. The third group is positioned between the first and second groups and in alignment with the air inlet.

In another embodiment of a cooking oven according to the present disclosure, the air diffuser is removable.

In another embodiment of a cooking oven according to the present disclosure, the structure is disposed at a non-ninety degree angle with respect to the wall.

In another embodiment of a cooking oven according to the present disclosure, the structure comprises a diffuser top clip and a diffuser bottom clip that mate with a wall top clip and a wall bottom clip disposed on the wall.

In another embodiment of a cooking oven according to the present disclosure, a dimension of one or both of the diffuser top clip and the diffuser bottom clip determines an amount of the non-ninety degree angle.

In another embodiment of a cooking oven according to the present disclosure, the heated air is diffused evenly across the food product and into the air inlet without reducing an overall mass flow rate of the airflow.

In another embodiment of a cooking oven according to the present disclosure, the air inlet comprises an array of holes.

In another embodiment of a cooking oven according to the present disclosure, the wall is a rear wall of the oven cavity.

In another embodiment of a cooking oven according to the present disclosure, a handle is attached to the air diffuser.

An embodiment of a method for a cooking oven according to the present disclosure comprises:

circulating heated air with a fan through a ductwork, an oven cavity and an air inlet disposed in a wall of the oven cavity; and installing an air diffuser in the oven cavity in front of the wall to diffuse the heated air evenly across the oven cavity and into the air inlet.

In another embodiment of the method according to the present disclosure, the installing step moves the air diffuser in the oven cavity until clips attached to the air diffuser engage clips attached to the wall.

In another embodiment of the method according to the present disclosure, a further step comprises: removing the air diffuser from the oven cavity by lifting the air diffuser until the clips attached to the air diffuser disengage from the clips attached to the wall.

In another embodiment of the method according to the present disclosure, a further step comprises: inclining the air diffuser with respect to the wall by a non-ninety degree angle.

In another embodiment of the method according to the present disclosure, a dimension of one or more of the clips attached to the air diffuser determines an amount of the non-ninety degree angle.

In another embodiment of the method according to the present disclosure, the air diffuser comprises a plate with a plurality of holes of different diameter sizes configured to diffuse the heated air.

In another embodiment of the method according to the present disclosure, a plurality of holes comprises a first group of large diameter sizes, a second group of large diameter sizes and a third group of small diameter sizes. The third group is positioned between the first and second groups and in alignment with the air inlet.

In another embodiment of the method according to the present disclosure, the heated air is diffused evenly across the food product and into the air inlet without reducing an overall mass flow rate of the heated air.

The present disclosure also provides many additional advantages, which shall become apparent as described below.

Further objects, features and advantages of the present disclosure will be understood by reference to the following drawings and detailed description.

BRIEF DESCRIPTION OF THE DRAWINGS

FIG. 2 is a front planar view of the air diffuser of the cooking oven of FIG. 1.

FIG. 3 is a left side view of FIG. 2.

FIG. 4 is a right sectional view along line 4 of FIG. 2.

FIG. 5 is a top view of FIG. 2.

FIG. 6 is a planar view of the top clip shown in FIGS. 3-5.

FIG. 7 is a planar view of the bottom clip shown in FIGS. 2-4.

FIG. 8 is a top view of FIG. 7.

FIG. 16 is a front view of an alternate top clip for the removable air diffuser of the cooking oven of FIG. 1.

FIG. 17 is an enlarged side view of FIG. 16.

FIG. 18 is a side view of an alternate bottom clip for the removable air diffuser of the cooking oven of FIG. 1.

FIG. 19 is side view of the rear wall of the oven cavity of the cooking oven of FIG. 1 with an alternate bottom clip.

FIG. 20 is a front view of a handle for the removable air diffuser of the cooking oven of FIG. 1.

FIG. 21 is an enlarged side view of FIG. 20.

FIG. 22 is a planar view of a front of the removable air diffuser of the cooking oven of FIG. 1 with the handle of FIG. 20.

FIG. 23 is a side view of FIG. 22.

DETAILED DESCRIPTION OF THE PREFERRED EMBODIMENT

Figure 1:
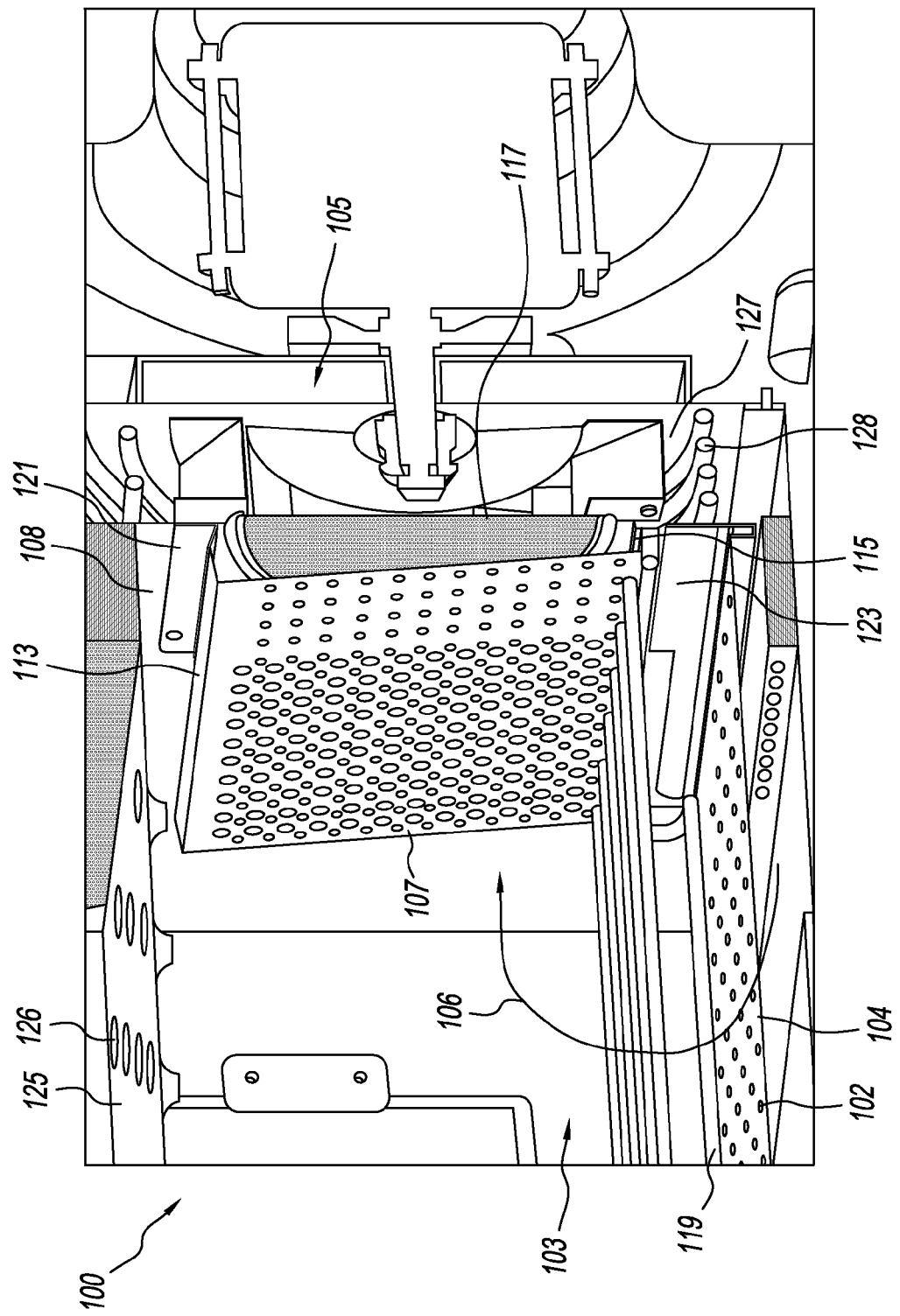
FIG. 1 is a front left perspective view of a cooking oven with a front side and right side removed to show an oven cavity with a sectional view of a removable air diffuser according to the present disclosure.
Figure 10:
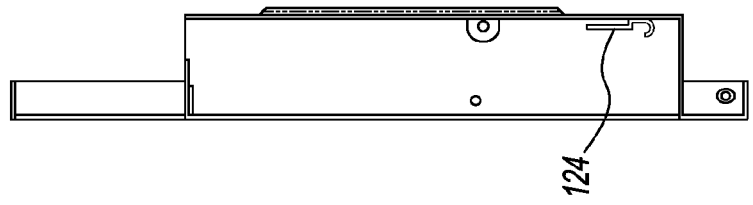
FIG. 10 is a sectional view along line 10 of FIG. 9.

Referring to FIG. 1, a cooking oven according to the present disclosure comprises an accelerated cooking oven 100 that includes a cooking cavity 103 in fluid communication with a fan 105 for circulating hot air in order to cook a food product (not shown) disposed in oven cavity 103. The hot air circulates in a path including oven cavity 103, fan 105, a ductwork 127 and apertures 102 of a lower plate 104 disposed at a bottom of oven cavity 103 and/or apertures 126 of an upper plate 125 disposed at a top of oven cavity 103. In some embodiments, apertures 102 and/or apertures 103 of upper plate 125 may be impingement nozzles. The airflow in oven cavity 103 is indicated by arrow 106 in FIG. 1. An electrical heater coil is disposed about a periphery of fan 105 to heat the circulating air. In some embodiments, a gas heater can be used instead of an electrical heater. A food rack 119 for holding the food product is disposed within and near a bottom of oven cavity 103 within the airflow.

Figure 9:
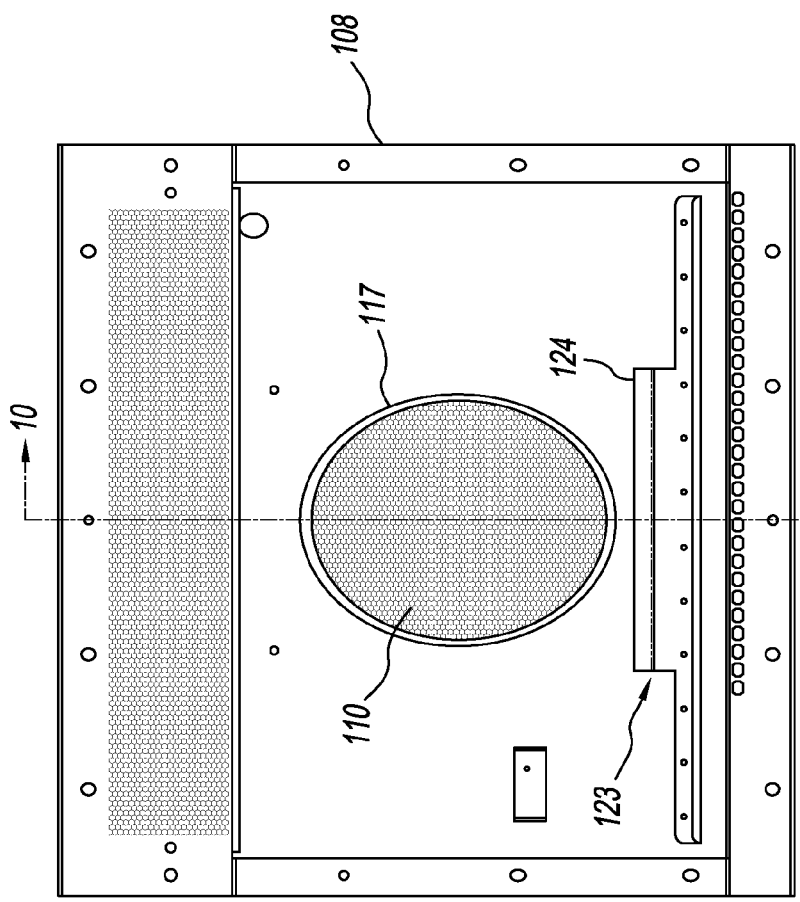
FIG. 9 is a planar view of a rear wall of the oven cavity of the cooking oven of FIG. 1.
Figure 11:
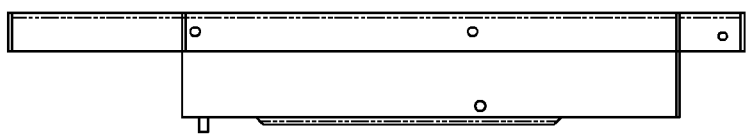
FIG. 11 is a left side view of FIG. 9.
Figure 15:
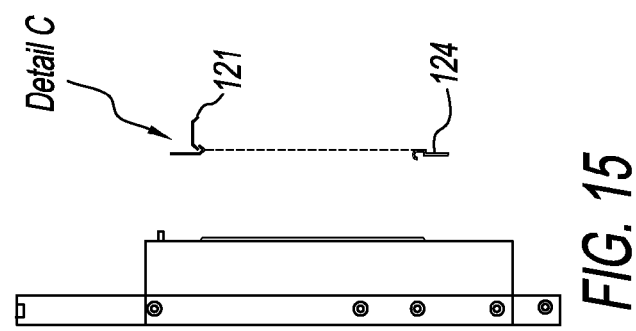
FIG. 15 is side view of FIG. 12.
Figure 13:
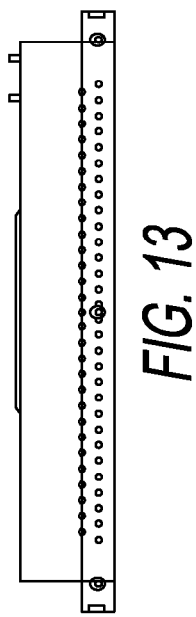
FIG. 13 is a top view of FIG. 12.
Figure 12:
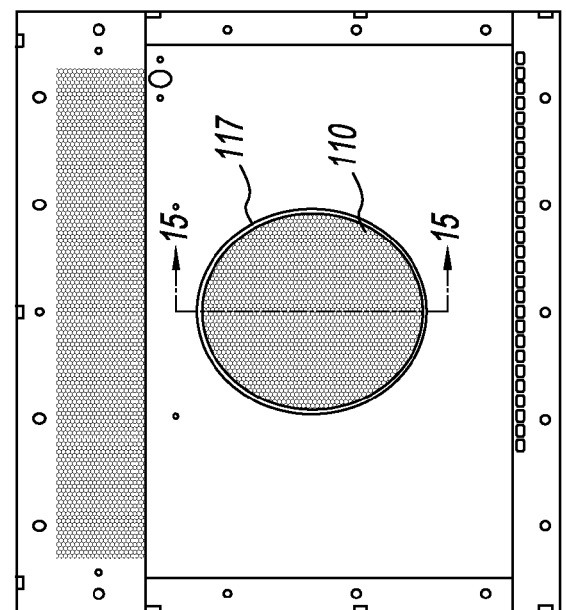
FIG. 12 is a planar view of the rear wall of the oven cavity shown in FIG. 11 with mating clips removed.
Figure 14:
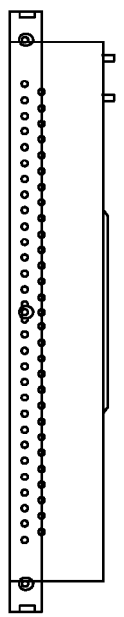
FIG. 14 is a bottom view of FIG. 12.

Referring also to FIGS. 9 and 12, a rear wall 108 of cooking cavity 103 comprises a centrally located air inlet 117 aligned with fan 105 through which the circulating hot air is drawn by fan 105. Air inlet 117 comprises an array of holes 110 through which the circulating air flows toward fan 105. Air inlet 117 may have any suitable shape. In preferred embodiments, air inlet 117 has a circular or oval shape.

Referring to FIGS. 1 and 2, a removable air diffuser 107 is positioned within oven cavity 103 in front of rear wall 108 of oven cavity 103 or between a food product on food rack 119 and rear wall 108. Removable air diffuser 107 is angled at a non-ninety degrees angle to horizontal or vertical. Removable air diffuser 107 comprises a perforated steel plate 112 with a top clip 113 and a bottom clip 115. Perforated steel sheet 112 comprises holes 109 and 111 of different hole diameter sizes across its plane so that the food product is not disturbed by high air speeds when the returning air is drawn through removable air diffuser 107 by rotating fan 105. The hole pattern helps to diffuse the airflow evenly across the food product and into the circulating fan return without reducing the overall mass flow-rate of the air. Mass flow-rate is the rate at which air passes through the system measured by mass per unit time and not volume per unit time. Removable air diffuser 107 is removable so that it can be cleaned after grease from the food product has been drawn and deposited onto removable air diffuser 107.

Referring to FIG. 2, an exemplary hole pattern of removable air diffuser 107 comprises an array of smaller holes 111 disposed centrally with the larger holes 109 disposed on either side of smaller holes 111. The configuration of holes 109 and 111 and hole sizes are important to the diffusion of air as the smaller holes 111, being directly in front of air inlet 117 of rear wall 108, restrict the amount of air that can pass directly through these holes into air inlet 117, while the larger holes 111 on either side allow the air to move freely through to change the airflow path, thereby diffusing the airflow. This leads to a uniform flow across the food product and not a focused high speed blast in the middle toward air inlet 117. Removable air diffuser 107 has a depth such that the cross section of the airflow is maintained in order that the flow rate (at a given pressure difference) is not affected.

If the air holes 111 are too small, then there is a disadvantage of restricting the airflow and negatively affecting cooking performance (food browning). The important hole configuration is the area where the larger holes 109 are placed (either side of the air inlet 117) so that the air has a direct path through air diffuser 107 and air inlet 117 is restricted, so that air diffusion is sufficient and effective.

Removable air diffuser 107 has small flanges on the side to give stiffness to the part. Removable air diffuser 107 works by diffusing the air before it enters the air inlet 117 (a circular configuration of holes), and continues through to rotating fan 105. The configuration of holes 109 and 111 and hole sizes are important to the diffusion of the air as the smaller holes 111 directly in front of air inlet 117 restrict the amount of air that can pass directly through these holes while the larger holes 109 on either side allow the air to move freely through changing the air path and therefore diffusing the air flow. The removable air diffuser 107 has a depth such that the cross section of the air flow is maintained in order that the flow rate (at a given pressure difference) is not affected.

Referring to FIGS. 1-7, top clip 113 and bottom clip 115 of perforated stainless steel plate 112 mate with a top clip 121 and a bottom clip 123 on rear wall 108 of oven cavity 103. When installing, removable diffuser 107 is lifted so that top clip 113 and bottom clip 115 engage top clip 121 and bottom clip 123, respectively, of rear wall 108. When removing, removable air diffuser 107 is lifted so that top clip 113 and bottom clip 115 disengage from top clip 121 and bottom clip 123, respectively.

Top clip 113 comprises a first portion 114 and a second portion 116 that form a hook shape as shown in FIGS. 3, 4 and 6. The hook shape is clearly shown in detail A of FIG. 6. Bottom clip 115 comprises a first portion 118, a second portion 120 and a third portion 122 shown in detail B of FIG. 7 that form a bracket shape also shown in FIGS. 3 and 4.

Referring to FIGS. 1, 9-10, 12 and 15, top clip 121 of rear wall 108 has a hook shape that mates with top clip 113 of removable air diffuser 107 when installed. Bottom clip 123 of rear wall 108 has a bracket portion 124 (FIGS. 9, 10 and detail C of FIG. 15) that receives or mates with third portion 120 of bottom clip 115 of removable air diffuser 107.

The angular orientation of removable air diffuser 107 is determined by the relative widths of top clip 113 and bottom clip 115. As shown in FIGS. 1, 3 and 4, the width of first portion 114 of top clip 113 is greater than the width of first portion 118 of bottom clip 115. This results in the non-ninety degree angular orientation of air diffuser 107 as shown in FIG. 1.

Referring to FIGS. 16 and 17, an alternate embodiment of the top clip for removable air diffuser 107 is shown as top clip 129 that comprises a portion 131 and an inclined portion 130. Inclined portion 130 includes a small bump 137 disposed near its middle.

Referring to FIG. 18, an alternate embodiment of a bottom clip of removable air diffuser 107 comprises a bottom clip 133 having an inclination for mating with the bottom clip of rear wall 108.

Referring to FIG. 19, an alternate embodiment of a bottom clip for rear wall 108 comprises a bottom clip 134 for mating with a bottom clip of removable air diffuser 107, for example, bottom clip 133 (FIG. 18).

Referring to FIGS. 20-23, a handle 135 for removable air diffuser 107 comprises a first portion 137 and a second inclined portion 136. As shown in FIGS. 22 and 23, handle 235 is attached to a top of removable air diffuser 107. For example, portion 137 is attached to a back surface of removable air diffuser 107 with portion 135 extending over a front of removable air diffuser 107 (see FIG. 23) for a user to grip for installation and removal of removable air diffuser 107 from oven cooking cavity 103.

The cooking oven and method of the present disclosure includes a number of key, functional differences versus conventional air diffusers including: (a) a removable diffuser plate which can be taken from the oven (without tools) for easy service/cleaning, (b) an angle of the plate is in a non 90 degree orientation aiding even airflow from the upper impinger/air flow nozzles, and (c) the hole pattern encourages air to take a meandering path to an inlet of the air circulation fan. This path has increased length but promotes a sustained air mass flow-rate.

While one or more embodiments are depicted in accordance with the disclosure, it is to be clearly understood that the same may be susceptible to numerous changes apparent to one skilled in the art. Therefore, the disclosure is not solely limited to the details shown and described, but is intended to show all changes and modifications that come within the scope of the appended claims.

What is claimed is:

1. A cooking oven comprising:
    a cooking cavity for cooking a food product, and comprising a vertical wall;
    an air inlet that is disposed centrally in said vertical wall;
    a plate that comprises a plurality of apertures and that is disposed at a bottom or a top of said cooking cavity;
    a ductwork in fluid communication with said cooking cavity via said apertures of said plate and said air inlet;
    a fan that circulates heated air via said ductwork, said plate, said cooking cavity and said air inlet to provide an airflow within said cooking cavity; and
    an air diffuser disposed within said airflow in said cooking cavity in front of said vertical wall and comprising a structure that diffuses said heated air evenly across said food product and into said air inlet.

2. The cooking oven of claim 1, wherein said structure comprises a sheet with a plurality of holes of different diameter sizes configured to diffuse said heated air.

3. The cooking oven of claim 2, wherein said plurality of holes comprises a first group of large diameter sizes, a second group of large diameter sizes and a third group of small diameter sizes, wherein said third group is positioned between said first and second groups and in alignment with said air inlet.

4. The cooking oven of claim 1, wherein said air diffuser is removable.

5. The cooking oven of claim 4, wherein said structure is disposed at a non-ninety degree angle with respect to said vertical wall.

6. The cooking oven of claim 5, wherein said structure comprises a diffuser top clip and a diffuser bottom clip that mate with a wall top clip and a wall bottom clip disposed on said vertical wall.

7. The cooking oven of claim 6, wherein a dimension of one or both of said diffuser top clip and said diffuser bottom clip determines an amount of said non-ninety degree angle.

8. The cooking oven of claim 1, wherein said heated air is diffused evenly across said food product and into said air inlet without reducing an overall mass flow rate of said airflow.

9. The cooking oven of claim 1, wherein said air inlet comprises an array of holes.

10. The cooking oven of claim 1, wherein said vertical wall is a rear wall of said cooking cavity.

11. The cooking oven of claim 1, further comprising a handle attached to said air diffuser.

12. A method for a cooking oven comprising:
    disposing a plate at a bottom or a top of a cooking cavity of said cooking oven, wherein said plate comprises a plurality of apertures;
    providing an airflow within said cooking cavity by circulating heated air with a fan through a ductwork, said plurality of apertures of said plate, said cooking cavity and an air inlet disposed in a vertical wall of said cooking cavity; and
    installing an air diffuser within said airflow in said cooking cavity in front of said vertical wall to diffuse said heated air evenly across said cooking cavity and into said air inlet.

13. The method of claim 12, wherein said installing step moves said air diffuser in said cooking cavity until clips attached to said air diffuser engage clips attached to said vertical wall.

14. The method of claim 13, further comprising:
    removing said air diffuser from said cooking cavity by lifting said air diffuser until said clips attached to said air diffuser disengage from said clips attached to said vertical wall.

15. The method of claim 12, further comprising:
    inclining said air diffuser with respect to said vertical wall by a non-ninety degree angle.

16. The method of claim 15, wherein a dimension of one or more of said clips attached to said air diffuser determines an amount of said non-ninety degree angle.

17. The method of claim 12, wherein said air diffuser comprises a sheet with a plurality of holes of different diameter sizes configured to diffuse said heated air.

18. The method of claim 17, wherein said plurality of holes comprises a first group of large diameter sizes, a second group of large diameter sizes and a third group of small diameter sizes, wherein said third group is positioned between said first and second groups and in alignment with said air inlet.

19. The method of claim 12, wherein said heated air is diffused evenly across said food product and into said air inlet without reducing an overall mass flow rate of said heated air.

20. A cooking oven comprising:
    a cooking cavity for cooking a food product, and comprising a wall;
    an air inlet that is disposed centrally in said wall;

a ductwork in fluid communication with said cooking cavity;

a fan that circulates heated air via said ductwork, said cooking cavity and said air inlet to provide an airflow within said cooking cavity; and an air diffuser disposed within said airflow in said cooking cavity in front of said wall and comprising a structure that diffuses said heated air evenly across said food product and into said air inlet, wherein said structure comprises a sheet with a plurality of holes of different diameter sizes configured to diffuse said heated air, wherein said plurality of holes comprises a first group of large diameter sizes, a second group of large diameter sizes and a third group of small diameter sizes, wherein said third group is positioned between said first and second groups and in alignment with said air inlet.

\* \* \* \* \*